2,951,776
Patented Sept. 6, 1960

2,951,776

STARCH PRODUCT AND METHOD OF PRODUCING SAME

Barrett L. Scallet, Clayton, and Ernest A. Sowell, St. Louis, Mo., assignors to Anheuser-Busch, Incorporated, St. Louis, Mo., a corporation of Missouri No Drawing. Filed Jan. 22, 1959, Ser. No. 788,259

4 Claims. (Cl. 127—71)

The present invention relates to a decolorized pregelatinized starch product produced from a partially refined starch. In particular, it relates to a decolorized pregelatinized starch that can be used as a drilling mud additive.

The manufacture and use of pregelatinized starches as drilling mud additives is well known. The action of these products in drilling muds is dependent upon their colloidal behavior.

A clay mud includes particles of clay having charges on them which are susceptible to being discharged when exposed to salts such as are contained in the salt water frequently met in drilling operations. It is generally believed that when pregelatinized starch is added to the mud, it forms a protective colloid on the clay particles and protects them from losing their charged characteristic. A discharged clay mud lises its desirable water loss or filtration loss characteristics as will be hereinafter more fully explained. It is therefore essential that an oil well drilling starch retain its water loss characteristic after decolorization and gelatinization.

The clay and starch mud is pumped into an oil well to help cool the bit and carry the cuttings up. It coats the walls of the hole, and if the water loss is too great, the mud builds up a thick cake on the inside of the bore hole which is undesirable. A thin impermeable filter cake on the inside bore hole is desired. This type filter cake is achieved only when an undegraded starch is added to the clay to make a drilling mud. The interaction of the starch with the clay system of the mud also influences the mud viscosity behavior, etc.

It has been customary in the corn wet milling industry to manufacture pregelatinized starches not only from the relatively pure finished starch but also from those starches taken from the intermediate stages of the refining process. As yellow corn is most often used by this industry, there is considerable yellow color found in the partially refined starch. The pigments responsible for this color are associated mainly with the non-starchy substances removed from the corn kernels during the starch extraction process. Ultimately the refining process removes these non-starchy highly pigmented substances leaving a relatively pure product having a very white color. If a starch containing these yellow colored substances is gelatinized and dried the resulting product has the pigmentation. This is considered by some consumers to be a disadvantage and forces them to use a more expensive product derived from the highly refined pigment free starch.

The pigments believed responsible for the yellowish coloration are sensitive to bleaching agents, and the color may be reduced or eliminated when the pure pigment in solution is treated with such an agent. However, such reactants as chlorine gas, hypochlorite, ozone, peroxides and other bleaching agents are not satisfactory in treating a slurry because they either degrade the starch, require special equipment for treating the slurry, or are uneconomical. Another difficulty in treating a starch slurry is that the colored pigments are combined with other material and the reactant must reach the pigment in order to decolor it. In the process of so doing, the reactant must not be of such a nature to degrade the starch.

It is an object of this invention to produce a decolored starch from a pigmented partially refined starch. It is a further object of this invention to provide a decolored starch which has all of the desirable filtration loss characteristics of an untreated starch. Another object is to provide a starch product for use in oil well drilling mud comprising an alkali metal chlorite treated starch. A further object is to provide an undegraded gelatinized starch produced from a partially refined starch slurry which has been treated with sodium chlorite, said starch being substantially lighter in color than untreated starch and having the same water loss characteristics as untreated starch when combined in a drilling mud.

Still another object of the present invention is to provide a novel method of decoloring a pigmented partially refined starch slurry. Another object is to provide a method of producing a decolored pregelatinized starch including the step of treating a partially refined starch slurry with a compound selected from the group consisting of alkali metal chlorites, alkaline earch metal chlorites, and ammonium chlorites, and preferably sodium chlorite.

Another object of the present invention is to provide an oil well drilling mud including a decolored partially refined starch, said mud having desirable filtration loss properties, and a novel method of producing said mud.

These and other objects and advantages will become apparent hereinafter.

The present invention comprises a decolored starch produced by reacting a partially refined starch slurry containing highly pigmented impurities with a compound selected from the class consisting of alkali metal chlorites, alkaline earth metal chlorites, and ammonium chlorite. More specifically, the present invention comprises reacting sodium chlorite with a partially refined corn starch slurry in an acid pH at a temperature below the gelatinization temperature of the starch. The sodium chlorite treated starch product is then gelatinized to produce a starch which is much lighter in color than untreated starch, and which will exhibit the same water loss properties as untreated starch when mixed with clay in an oil well drilling mud.

The invention further consists in the process hereinafter described and claimed, and in the decolorized oil well drilling starch made by said process.

A detailed description of the present invention follows.

A partially refined starch slurry having a Baumé of about 21° at 60° F. is provided. A partially refined starch slurry is intended to mean the product resulting from grinding the corn and then passing water over it and screening. The starch slurry can be further refined before treating it according to this invention, if desired. The Baumé of the slurry is not critical and can range from about 10° to about 25°. However, a Baumé of from about 20° to about 24° is preferred because of the commercial equipment usually available.

The starch slurry usually contains less than about 8% highly pigmented impurities. If the starch slurry is made from corn starch, the pigments will be yellow. The amount of impurities depends upon the state of the refining process, and can vary from about 8% to about 0.1%. The nature of these impurities is not fully understood, however, they are generally believed to be plant pigments in association with proteinaceous, fatty, and cellulose type materials commonly called corn gluten.

The amount of impurities has been calculated by determining the amount of protein present. In determining this amount of protein, the nitrogen value is determined by a standard Kjeldahl test and multiplied by a factor of 6.25 to give the amount of protein.

A small amount of a compound selected from the class consisting of alkali metal chlorites, alkaline earth metal chlorites, and ammonium chlorite is added to the starch slurry. The amount of chlorite that can be added will depend somewhat on the degree of pigment present, the desired final color of the starch, and the chlorite used. An amount of reactant sufficient to furnish from about 0.16% to about 0.83% of the $ClO_2$ radical by weight based on the weight of dry starch should be added. From about 0.15% to about 2.5% and preferably from about 0.25% to about 1.0% of the reactant by weight based upon the weight of the dry starch solids in the slurry is added to the starch slurry to furnish the necessary amount of chlorite. If less than about 0.15% reactant is used, the decoloring effect is not completely effective to give a desired decolored product. If more than about 2.5% reactant is used, the reaction between the chlorite and the starch proceeds at a rate and to an extent that will degrade the starch. A degraded starch is ineffective in an oil well drilling mud since the water loss is too great when subjected to standard filtration loss tests, which will be hereinafter more fully explained.

When using the preferred reactant, sodium chlorite, in treating the starch slurry, from about 0.25% to about 1.0% sodium chlorite by weight based on the weight of dry starch is used to obtain optimum results.

All of the alkali metal chlorites and the alkaline earth metal chlorites are effective in this invention including potassium chlorite, sodium chlorite, lithium chlorite, barium chlorite, calcium chlorite, etc., and mixtures thereof; however, from a standpoint of costs, availability, and operating effectiveness, sodium chlorite is preferred. Ammonium chlorite can also be used in this invention, however, it is stable only in solution and must be added to the slurry in this form.

While this invention is primarily intended for use with a yellow corn starch slurry, it also is effective with other starch slurries such as wheat starch, potato starch, etc. The color change will be different with these other starches, since the corn starch contains a yellowish pigment which changes to a light tan or an off white when treated according to this invention.

The temperature of the reaction is not critical, however, it should be below about 130° F. which is the maximum safe temperature to prevent premature gelatinization of the starch. For convenience of operation in presently existing plants, the reaction is preferably carried out at a temperature of between about 90° F. to about 120° F.

The reaction preferably should be allowed to proceed at least about two hours, or the desired decoloring effects are not completely attained. Reacting for more than about two hours does not produce any undesirable effects on the starch, but it does not appreciably increase the decoloring effect. If the reaction is carried out less than about two hours, maximum decoloring of the starch is not achieved, unless an uneconomical amount of reactant is used.

It is essential that the reaction be carried out in an acid pH or a pH of less than about 7. A pH of from about 4 to 7 is satisfactory, but a pH from about 4 to about 5 is preferred. If the starch solution becomes alkaline, the water loss properties of the starch are destroyed, and it becomes unsatisfactory for use in oil well drilling muds.

The terms water loss and filtration loss are used herein as prescribed in standard tests of the American Petroleum Institute. Specifically, the water loss tests are Standard Salt Water API Filtration Loss Tests as described in Standard Field Procedures For Testing Drilling Fluids—API Code No. 29, American Petroleum Institute, Division of Production, Dallas, Texas.

Briefly described, this test uses a cylinder having an apertured plate at one end thereof. A screen is placed over the aperture and filter paper is placed on the screen. A standard drilling mud is mixed with the starch and salt water and placed on the filter paper. A gas pressure of one hundred pounds per square inch is then exerted on the mud for thirty minutes, and the water that is forced from the mud through the aperture is measured. This test is conducted with a mud having a water loss in excess of 50 cc. without the starch additive. In comparing the results of this test, an untreated control starch is mixed with the same type mud and the water loss thereof is compared to the water loss of the starch treated in accordance with this invention. A mud and starch mixture is considered unsatisfactory if it shows a water loss of more than about 10 cc. when subjected to the above test.

In determining the change in color of a starch, the starch color before treatment and the starch color after treatment are compared to the Munsell Book of Color published by the Munsell Color Company, Inc., 10 East Franklin Street, Baltimore, Maryland. The colors of yellow corn starch fall in the Yellow Hue. Very briefly, the Munsell system arranges colors according to hue such as yellow, blue, green, etc., and values ranging from 0 to 10 which represent the reflectance or brightness of the different hues. The various hues are also rated according to chroma or the degree of saturation. The degree of saturation may be regarded as a measure of the extent to which the specified color departs from a neutral gray of the same brightness. The expression of the color is given as Hue-Value/Chroma.

After the starch slurry has been treated with the sodium chlorite, it is sent to the gelatinization process where it is cooked, dried, and pulverized in the manner normally used in making drilling mud starch.

The following are specific examples of the present invention:

*Example I*

2500 gallons of a corn starch slurry having a Baumé of 21° at 60° F. and containing 5% yellowish pigmented non-starchy impurities is treated with an amount of sodium chlorite equivalent to 1.0% based upon the starch solids of the slurry. The pH of the slurry is 4.7 and the temperature is 120° F. At the end of a two hour reaction period, the slurry is processed by the equipment used in the manufacture of pregelatinized starch, that is, it is cooked, dried and pulverized. The effectiveness of the sodium chlorite treatment is determined by comparing of the color of the treated product with that of an untreated control. Color estimates are made using the Munsell Book of Color. The untreated control starch has a Munsell color of approximately Y8/7 which is distinctly yellow, whereas the treated starch has a color of Y8/2 which is almost white. Standard salt water API filtration loss tests show that the sodium chlorite treatment does not alter the starch adversely as a drilling mud filtration control agent. The untreated control starch has a filtration loss of 8.0 ml. The modified starch product also has a filtration loss of 8.0 ml. when both are treated by the API Code No. 29 as hereinbefore more fully explained.

*Example II*

2500 gallons of a corn starch slurry having a Baumé of 21° at 60° F. and containing approximately 2% yellowish pigmented non-starchy impurities is treated with a quantity of sodium chlorite equivalent to 0.25% of the dry weight of the starch in the slurry. The pH of the slurry is 4.5 and the temperature is 120° F. The reaction time is two hours. The finished pregelatinized starch has a Munsell color of Y8/3, a whitish tan. The color of the untreated control is Y8/7, which is distinctly yellow. It is preferred that the starch be decolored to a Munsell value of at least Y8/4. The API filtration loss test (API Code No. 29) gives a value of 7.6 ml. on the untreated control, and a value of 7.7 ml. on the decolorized product.

Thus, it is apparent that the present invention provides a decolored starch product and method of producing same which fulfills all the objects and advantages sought therefor. The present invention specifically provides a decolored treated starch product which is suitable for use in oil well drilling mud.

This invention is intended to cover all changes and modifications of the examples of the invention herein chosen for purposes of the disclosure, which do not constitute departures from the spirit and scope of the invention.

What is claimed is:

1. A process for producing an oil well drilling starch including the steps of combining a starch slurry in granule form having a Baumé of 10°–25° at 60° F. containing less than 8% pigmented corn gluten impurities and a chlorite selected from the group consisting of alkali metal chlorites, alkaline earth metal chlorites and ammonium chlorite in an amount sufficient to decolor the starch without degrading it, recovering an undegraded partially decolored granular starch product, gelatinizing the partially decolored starch product to further decolor the pigmented impurities, and recovering a substantially decolored, gelatinized, undegraded cold swelling oil well drilling starch which has substantially the same water loss characteristics as a normal colored gelatinized starch.

2. A method of decoloring starch including the steps of reacting a partially refined corn starch slurry in granule form having a Baumé of between 10°–25° at 60° F. containing less than 8% pigmented impurities with a compound selected from the group consisting of alkali metal chlorites, and ammonium chlorite, maintaining said reaction in an acid medium at a temperature below the gelatinization temperature of the starch for at least about 2 hours, gelatinizing said treated starch, and recovering a dry, flaky, decolored, undegraded, gelatinized starch product.

3. A method of producing a decolored pregelatinized starch suitable for use in drilling mud including the steps of reacting a partially refined corn starch slurry in granule form having a Baumé of between 10°–25° at 60° F. containing less than about 3% yellowish pigmented impurities including plant pigments in association with corn gluten with from about 0.25% to about 1.0% sodium chlorite by weight based on the weight of dry starch in an acid medium, gelatinizing the starch, and recovering a dry, flaky, undegraded gelatinized treated starch which is substantially lighter in color than gelatinized untreated starch and which has substantially the same water loss when combined in a drilling mud as gelatinized untreated starch.

4. A process for producing an oil well drilling starch including the steps of combining a colored yellow corn stripper starch containing less than 3% pigmented corn gluten impurities and from about 0.25% to about 1% sodium chlorite at a temperature below about 120° F. for at least 2 hours in an acid medium, gelatinizing the decolored starch product, and recovering a substantially decolored, gelatinized, cold swelling starch product.

References Cited in the file of this patent

UNITED STATES PATENTS

| | | |
|---|---|---|
| 2,343,048 | Eble et al. | Feb. 29, 1944 |
| 2,364,434 | Foster | Dec. 5, 1944 |
| 2,409,085 | Vincent | Oct. 8, 1946 |
| 2,417,307 | Larsen | Mar. 11, 1947 |

UNITED STATES PATENT OFFICE
CERTIFICATE OF CORRECTION

Patent No. 2,951,776            September 6, 1960

Barrett L. Scallet et al.

It is hereby certified that error appears in the printed specification of the above numbered patent requiring correction and that the said Letters Patent should read as corrected below.

Column 1, line 31, for "lises" read -- loses --; column 2, line 25, for "earch" read -- earth --; column 5, line 35, after "chlorites," insert -- alkaline earth metal chlorites, --.

Signed and sealed this 11th day of April 1961.

(SEAL)
Attest:
ERNEST W. SWIDER
Attesting Officer

ARTHUR W. CROCKER
Acting Commissioner of Patents